US011633986B2

United States Patent
Erbizzoni et al.

(10) Patent No.: US 11,633,986 B2
(45) Date of Patent: Apr. 25, 2023

(54) TYRE FOR BICYCLE WHEELS (71) Applicant: Pirelli Tyre S.p.A., Milan (IT)

(72) Inventors: Laura Erbizzoni, Milan (IT); Vinicius Augusto Dal Bello Lindo, Milan (IT); Pierangelo Misani, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 17/055,275

(22) PCT Filed: May 21, 2019

(86) PCT No.: PCT/IB2019/054185
§ 371 (c)(1),
(2) Date: Nov. 13, 2020

(87) PCT Pub. No.: WO2019/224714
PCT Pub. Date: Nov. 28, 2019

(65) Prior Publication Data
US 2021/0188005 A1 Jun. 24, 2021

(30) Foreign Application Priority Data
May 22, 2018 (IT) .................. 102018000005602

(51) Int. Cl.
*B60C 3/04* (2006.01)
*B60C 9/18* (2006.01)
(Continued)

(52) U.S. Cl.
CPC .......... *B60C 9/1807* (2013.01); *B60C 1/0016* (2013.01); *B60C 9/2009* (2013.01);
(Continued)

(58) Field of Classification Search
CPC . B60C 9/0028; B60C 2001/0066; B60C 9/12; B60C 15/0018; B60C 2200/12; B60C 2200/10; B60C 11/0083
See application file for complete search history.

(56) References Cited

U.S. PATENT DOCUMENTS 3,006,899 A  10/1961  Hill et al.
3,063,966 A  11/1962  Kwolek et al.
(Continued)

FOREIGN PATENT DOCUMENTS

CN  105313598 A  2/2016
CN  207207635 U  4/2018
(Continued)

OTHER PUBLICATIONS

Machine translation of JP 2006-117078, 2006.*
(Continued)

*Primary Examiner* — Justin R Fischer
(74) *Attorney, Agent, or Firm* — Finnegan, Henderson, Farabow, Garrett & Dunner, L.L.P.

(57) ABSTRACT

The present invention relates to a tyre for bicycle wheels comprising a tread band containing an anti-puncture system capable of offering high resistance to the penetration of foreign bodies. In particular, the present invention relates to a tyre (100) for bicycle wheels comprising: —a carcass structure (2); and —a tread band (7) arranged in a radially outer position with respect to said carcass structure (2); characterised in that said tread band (7) is made by vulcanisation of a vulcanisable elastomeric compound comprising fibrillated polymeric fibres of micrometric dimensions, wherein at least one protective layer (6, 11) is interposed between said carcass structure (2) and said tread band (7), said protective layer (6, 11) comprising (i) a plurality of reinforcing cords of textile material oriented with respect to the equatorial plane of the tyre with an angle greater than
(Continued)

30°, (ii) a square fabric with textile fibres of the weft or warp oriented with respect to the equatorial plane of the tyre with an angle greater than 20°, or (iii) a non-woven fabric with randomly oriented textile fibres.

23 Claims, 5 Drawing Sheets

(51) Int. Cl.
  *B60C 11/00* (2006.01)
  *B60C 1/00* (2006.01)
  *B60C 9/20* (2006.01)
  *B60C 15/00* (2006.01)

(52) U.S. Cl.
  CPC ...... *B60C 11/0083* (2013.01); *B60C 15/0045* (2013.01); *B60C 2009/1814* (2013.01); *B60C 2009/2019* (2013.01); *B60C 2200/12* (2013.01)

(56) References Cited

U.S. PATENT DOCUMENTS

| | | | |
|---|---|---|---|
| 3,094,511 A | | 6/1963 | Hill et al. |
| 3,287,323 A | | 11/1966 | Kwolek et al. |
| 3,322,728 A | | 5/1967 | Hill et al. |
| 3,349,062 A | | 10/1967 | Hill et al. |
| 3,354,127 A | | 11/1967 | Hill et al. |
| 3,380,969 A | | 4/1968 | Hill et al. |
| 3,442,315 A | * | 5/1969 | Mirtain .............. B60C 9/17 152/557 |
| 3,443,315 A | | 5/1969 | Herzegh |
| 3,671,542 A | | 6/1972 | Kwolek |
| 3,951,914 A | | 4/1976 | Kwolek |
| 4,649,979 A | | 3/1987 | Kazusa |
| 4,739,814 A | * | 4/1988 | Berczi ................. B60C 9/2009 152/538 |
| 4,871,004 A | | 10/1989 | Brown et al. |
| 5,695,578 A | * | 12/1997 | Boiocchi ............. B60C 9/1821 152/526 |
| 8,474,499 B2 | | 7/2013 | Tuffile et al. |
| 8,833,416 B2 | | 9/2014 | Bestgen et al. |
| 9,016,341 B2 | | 4/2015 | Klapp et al. |
| 9,821,605 B2 | * | 11/2017 | Matsuda ............. B60C 15/0018 |
| 2009/0236022 A1 | | 9/2009 | Matsuda et al. |
| 2013/0312883 A1 | | 11/2013 | Yang et al. |
| 2017/0021671 A1 | | 1/2017 | Kitahara et al. |
| 2017/0197475 A1 | | 7/2017 | Wurmback |
| 2018/0072099 A1 | | 3/2018 | Giannini et al. |

FOREIGN PATENT DOCUMENTS

| | | |
|---|---|---|
| DE | 102014214893 A1 | 2/2016 |
| EP | 0329589 A2 | 8/1989 |
| EP | 1384601 A1 | 1/2004 |
| JP | S 60-50004 A | 3/1985 |
| JP | H11139109 A | 5/1999 |
| JP | 2001-10305 A | 1/2001 |
| JP | 2006-117078 * | 5/2006 |
| JP | 2006-117078 A | 5/2006 |
| TW | M444951 U | 1/2013 |
| TW | 201348029 A | 12/2013 |
| WO | WO 2014049516 A1 | 4/2014 |
| WO | WO 2016/174629 A1 | 11/2016 |
| WO | WO 2018/207068 A1 | 11/2018 |

OTHER PUBLICATIONS

International Search Report form the European Patent Office in corresponding International Application No. PCT/IB2019/054185 dated Aug. 2, 2019.
Written Opinion of the International Searching Authority from the European Patent Office in corresponding International Application No. PCT/IB2019/054185 dated Aug. 2, 2019.
Notification of Second Office Action issued by the China National Intellectual Property Administration dated Aug. 26, 2022, in corresponding Application No. CN 201980032216.7 (9 pages).

* cited by examiner

TYRE FOR BICYCLE WHEELS

This application is a national stage entry application under 35 U.S.C. § 371 based on International Application No. PCT/IB2019/054185, filed May 21, 2019, and claims priority to Italian Patent Application No. 102018000005602, filed May 22, 2018; the contents of each application is incorporated herein by reference.

DESCRIPTION

Field of the Invention

The present invention relates to a tyre for bicycle wheels with improved anti-puncture performance.

In particular, the present invention relates to a tyre for bicycle wheels containing an anti-puncture system comprising a tread band and a protective layer capable of offering high resistance to the penetration of foreign bodies. The tyre of the present invention can be used on the wheels of racing bicycles, off-road bicycles, and in city bicycle wheels.

Prior Art

A tyre for bicycle wheels typically comprises a carcass structure back-folded around a pair of bead cores at the beads and a tread band arranged in a radially outer position with respect to the carcass structure.

The carcass structure is intended to withstand the inflation pressure and to support the weight of the bicycle and the cyclist. It comprises one or more carcass plies, each comprising a plurality of suitably oriented reinforcing cords. In the case of several carcass plies, they are inclined with respect to each other to form a crossed structure.

The bead cores have the task of ensuring that the tyre is anchored to the wheel rim.

In the radially inner position of the carcass structure, an air chamber may be provided in which pressurised air is introduced. In the mountain bike (MTB) sector but lately also for racing bikes, types of tires called "tubeless", i.e. without an inner tube, are increasingly widespread. In these tyres, the pressurised air acts directly on the carcass structure. The latter and the wheel rim are shaped in such a way that their mutual anchoring guarantees air tightness.

The tread band is designed to guarantee the grip of the tyre to the asphalt or to the ground (or in general to the rolling surface).

The elastomeric compounds intended for manufacturing the tread band and the other tyre components are generally characterised by the presence of elastomeric polymers and one or more reinforcement fillers based on carbon black and/or silica, useful for improving the mechanical features thereof, in particular stiffness. Said elastomeric compounds may comprise other commonly used additives, selected on the basis of the specific application for which the compound is intended. For example, said compounds may be admixed with: antioxidants, anti-ageing agents, plasticisers, adhesives, anti-ozone agents, modifying resins, fibres (such as Kevlar® pulp) or mixtures thereof.

EP0329589, for example, describes tyres for vehicle wheels in which at least one of the components is made of an elastomeric compound comprising reinforcement fillers including aramidic Kevlar® pulp fibres.

Among the desirable features for a tyre for bicycle wheels, puncture resistance is increasingly required by users.

The problem of resistance to puncture, in particular in tyres for bicycle wheels, has been addressed in the art and various solutions have been proposed for it.

In U.S. Pat. No. 8,474,499, for example, a perforation-resistant metallic laminate is proposed to be interposed between the tread band and carcass plies.

U.S. Pat. No. 9,016,341 describes a breaker, i.e. a textile reinforcement resistant to perforation, also in this case interposed between the tread band and carcass plies. This solution is proposed in various other documents known in the art and is the one most commonly used among tyre manufacturers.

U.S. Pat. No. 8,833,416 describes the use of a modified air chamber, capable of resisting air leakage after perforation.

EP1384601 describes the insertion, between the tread band and carcass plies, of an additional protective layer composed of a highly elastic compound capable of improving the puncture resistance, at the same time improving the rolling resistance due to the high elasticity of the introduced component.

SUMMARY OF THE INVENTION

The Applicant has posed the problem of manufacturing a tread band with an elastomeric compound comprising materials which are capable of conferring high puncture protection for all types of bicycle wheel tyres, from the lighter ones dedicated to racing bicycles, to those heavier for off-road bikes, including those for city bicycle wheels.

The Applicant has found that the use of fibrillated polymeric fibres in compounds intended for the production of the tread band conferred increased puncture resistance to said compounds compared to that of the materials used for the tread band of standard production.

However, the Applicant has also found that the protection conferred by a tread band made with said compounds comprising fibrillated polymeric fibres was not entirely sufficient to avoid in particular even punctures caused by very fine sharp elements, such as thorns or splinters or sharp stones.

However, the Applicant has surprisingly found that the use of a tread band made with compounds comprising fibrillated polymeric fibres, in combination with a radially inner protective layer reinforced with reinforcing cords made of textile fibres oriented with respect to the equatorial plane of the tyre with an angle greater than 30° interposed between the carcass structure and the tread band allowed obtaining an improved and sufficient puncture resistance for all types of uses.

Subsequently, following further experimentation, the Applicant has also surprisingly found that similar results were also obtained by using in this combination a protective layer made of a square fabric with textile fibres of the weft or warp oriented with respect to the equatorial plane of the tyre with an angle greater than 20°, or using a protective layer made of non-woven fabric with randomly oriented textile fibres.

Moreover, the Applicant has also verified that even better results could be obtained by adding a further protective layer, made with the same textile materials, in a radially inner position with respect to the carcass structure or in the same carcass structure, interposed between the flaps of the carcass ply. Although this result has not yet found a definitive explanation, the Applicant believes that the interaction between the object capable of causing the puncture (debris, thorn, splinter, and so on) and the tread compound comprising fibrillated polymeric fibres causes a sort of winding of the penetrating end of this object, such as to cause a reduction in the sharpness thereof and a rounding, which reduces the penetration force thereof to the point of being no longer able to pass through the protective layer made according to the present invention.

Therefore, in a first aspect, the present invention relates to a tyre for bicycle wheels comprising a carcass structure, and a tread band arranged in a radially outer position with respect to the carcass structure, wherein the tread band is made by vulcanisation of a vulcanisable elastomeric compound comprising fibrillated polymeric fibres of micrometric dimensions, and wherein at least one protective layer is interposed between said carcass structure and said tread band, said protective layer comprising (i) a plurality of reinforcing cords of textile material oriented with respect to the equatorial plane of the tyre with an angle greater than 30°, (ii) a square fabric with textile fibres of the weft or warp oriented with respect to the equatorial plane of the tyre with an angle greater than 20°, or (iii) a non-woven fabric with randomly oriented textile fibres.

Optionally, the tyre for bicycle wheels of the present invention comprises at least one further protective layer arranged in a radially inner position with respect to said tread band, preferably interposed in said carcass structure or in a radially inner position with respect to said carcass structure.

DESCRIPTION OF THE INVENTION

In the present description and following claims, the following definitions apply. "Racing bicycles" is meant to refer to high performance bicycles for road or track competitions. These bicycles include those that meet the rules established by the Union Cycliste Internationale (UCI)—Title I—General Organization of Cycling Sports—Chapter 3: Equipment Section 2. Within the present scope, recumbent bicycles, time trial bicycles and/or triathlon bicycles are also included. Also included are the so-called fitness bikes (racing bikes for recreational use).

"City bicycles" is meant to refer to bicycles intended for a predominantly urban use for urban journeys on roads or mainly asphalted cycleways (urban bikes, city bikes, trekking bikes and touring bikes, as well as electric or pedal-assisted versions). These bicycles are generally fitted with accessories designed to improve safety and comfort of use, such as good front and rear lighting for good visibility, a crankcase (or chain cover) to protect clothes from the chain, a luggage rack for light luggage or a front basket, and are generally made with 26" or 28" wheels with intermediate covers, neither too smooth as for racing bikes nor with blocks as for off-road bicycles.

"Off-road bicycles" is meant to refer to bicycles intended to cover typically uneven or irregular terrain, that is, grounds very different from each other and different from asphalt, such as muddy, sandy, rocky, compact, soft ground, and so on. These bicycles include those that meet the rules established by the Union Cycliste Internationale (UCI) for the respective specialties and include in particular mountain bikes (MTB) or all terrain bikes (ATB), conventionally divided into the Cross Country (XC), Marathon, Trail, All Mountain, Enduro, Freeride, and Downhill categories, as well as fat bikes, cyclocross, and electric or pedal-assisted versions.

By "equatorial plane" of the tyre it is meant a plane perpendicular to the axis of rotation of the tyre and which divides the tyre into two symmetrically equal parts.

The terms "radial" and "axial" and the expressions "radially inner/outer" and "axially inner/outer" are used referring to a direction perpendicular and a direction parallel to the axis of rotation of the tyre, respectively.

The terms "circumferential" and "circumferentially" are used with reference to the direction of the annular development of the tyre, i.e. to the rolling direction of the tyre, which corresponds to a direction lying on a plane coinciding with or parallel to the equatorial plane of the tyre.

The term "elastomeric compound" is used to designate a composition comprising at least one elastomeric polymer and at least one reinforcement filler. Preferably, such composition further comprises additives such as, for example, a cross-linking agent and/or a plasticiser. Due to the presence of the cross-linking agent, such a compound can be cross-linked (vulcanised) by heating.

The term "elastomeric polymer" or "elastomer" is meant herein to indicate a vulcanisable natural or synthetic polymer which, at room temperature, after being subjected to vulcanisation, is susceptible to deformations due to a force and is capable of recovering rapidly and vigorously the substantially original shape and dimensions after the elimination of the deforming force (according to the definitions of the ASTM D1566-11 Standard terminology relating to Rubber).

The term "cord" or the expression "reinforcing cord" is used to indicate an element consisting of one or more thread-like elements (hereinafter also referred to as "threads") possibly coated with, or incorporated into, an elastomeric compound matrix.

The expression "reinforced ribbon-like element" is meant to indicate an elongated article having a flattened cross-sectional profile and comprising one or more reinforcing cords extended parallel to the longitudinal development of the article and incorporated into, or at least partially coated with, at least one layer of an elastomeric compound matrix.

"Diameter" of a cord or thread means the thickness of the cord or thread measured as prescribed by the BISFA E10 method (The International Bureau For The Standardization Of Man-Made Fibers, Internationally Agreed Methods For Testing Steel Tire Cords, 1995 edition).

"Density" or "density of cords" of a layer or a ply or a fabric means the number of reinforcing cords per unit of length present in such a layer/ply/fabric. The density is measurable in TPI (threads per inch).

"Linear density" or "thread count" of a cord or thread means the weight of the reinforcing cord per unit of length. The linear density can be measured in dtex (grams per 10 km in length).

The expression "high elastic modulus fibres" means fibres of a material having elastic modulus or stiffness of not less than 30 GPa, such as Aramid fibres and Lyocell fibres.

For aramid fibres (AR), the elastic modulus is evaluated according to BISFA—Testing methods for para-aramid fiber yarns, 2002 edition, Determination of linear density—Chapter 6, Determination of the tensile properties—Chapter 7—Test procedures—Paragraph 7.5—with procedure with initial pretensioning.

For lyocell fibres, the elastic modulus is evaluated according to: BISFA—Testing methods for viscose, cupro, acetate, triacetate and lyocell filament yarns—2007 edition, Determination of tensile properties—Chapter 7—Tensile test conditions: oven dry test—Table 7.1—Test procedure—Paragraph 7.5—With oven dry test on relaxed samples—Subparagraph 7.5.2.4.

The term "fitting diameter" of a tyre means the diameter of the tyre measured at the internal diameter of the bead cores for anchoring the tyre to the wheel rim, as prescribed in ETRTO (The European Tyre and Rim Technical Organization).

"Axial development of the tread band" or of portions thereof means the development of the radially outermost profile of the tread band or of portions thereof in a cross-section of the tyre performed by means of a plane containing the rotation axis of the tyre.

"Axial development of the tyre" means the development of the radially outermost profile of the tyre in a cross-section of the tyre performed by means of a plane containing the rotation axis of the tyre, such an axial development being measured between the ends of the tyre beads.

"Width" of a tyre means the maximum axial extension of the tyre, Sg width according to the ETRTO standard—Manual Standards 2018—Cycle and Motorcyle Tyres—M5, such a width being measured between the axially outermost points of the tyre.

"Tread camber" of the tyre means the camber measured through a camber radius of a portion of the profile of a cross section of the tyre.

By "camber radius" of a portion of the profile of a cross section of the tyre means the radius of the circumference that best approximates that profile portion.

Hereinafter in the present description and in the following claims, when reference is made to certain values of certain angles, absolute values will be understood, that is, both positive values and negative values with respect to a reference plane.

According to an aspect of the present invention, the tread band is made by vulcanisation of a vulcanisable elastomeric compound comprising fibrillated polymeric fibres of micrometric dimensions.

Preferably, the fibrillated polymeric fibres of micrometric dimensions are polymer fibres with a melting temperature of at least 170° C., preferably at least 190° C.

The fibrillated polymeric fibres useful in the present invention are represented, for example, by aramid fibres (for example Kevlar® Pulp by DuPont® or Twaron® pulp by Teijin Aramid), polyester fibres (for example Vectran® Pulp by Engineered Fibers Technology), acrylic fibres (for example CFF® Fibrillated Fiber by Engineered Fibers Technology and CFF® Pulp by Sterling Fibers), microfibrillated cellulose fibres (for example WMFC Q_ECO, by WEIDMANN FIBER TECHNOLOGY), and vegetable fibres (for example Setralit® by ECCO Gleittechnik).

The term "fibrillated polymeric fibres" means that the fibres themselves have an irregular and branched shape, with a main trunk from which thinner filaments of frayed fibres branch off, which give the fibre a greater surface area and better anchoring and binding features compared to non-fibrillated fibres. The "fibrillated polymeric fibres" are obtained from non-fibrillated fibres through mechanical, thermal and chemical processes.

The term "micrometric dimensions" referring to fibres means that the fibres have a diameter or maximum cross-sectional dimension of less than 100 μm (micrometres), typically greater than 500 nm (nanometres).

Aramid fibres are synthetic fibres obtained from aromatic polyamides, i.e. a particular class of nylon obtained by condensation in solution of aromatic diamines and aromatic dicarboxylic acids. The aramid fibres and the preparation process hereof are known in the literature and described, for example, in U.S. Pat. Nos. 3,006,899, 3,063,966, 3,094,511, 3,287,323, 3,322,728, 3,349,062, 3,354,127, 3,380,969, 3,671,542, and 3,951,914.

Kevlar® is a particular aramid fibre obtained by condensation in solution starting from 1,4-phenylenediamine (para-phenylenediamine) monomers and terephthaloyl chloride.

Kevlar® pulp is a material obtained by fibrillation of Kevlar® fibres according to a proprietary DuPont® technology. Kevlar® pulp typically has fibres with a total length of 0.5-1 mm, surface area of 7-11 $m^2/g$ and main fibre diameter of between 10 and 18 micrometres (μm).

Polyester fibres are synthetic fibres obtained from polyesters, or polymers obtained by condensation of monomers comprising at least one carboxyl group (—COOH) and at least one hydroxyl group (—OH).

Vectran® is a completely aromatic-based polyester with melted crystalline liquid features, obtained by condensation of 4-hydroxybenzoic acid with 6-hydroxy-2-carboxy naphthalene acid, produced by Kuraray and Celanese.

Vectran® Pulp is a material obtained by fibrillation of Vectran® fibres, for example from Engineered Fibers Technology. Vectran® pulp typically has fibres with an overall length of 1 to 6 mm and fibril diameter of few micrometres.

Acrylic fibres are synthetic fibres obtained from polyacrylates, or polymers obtained by polymerization, typically radical, of acrylic monomers and in particular of acrylonitrile.

The "CFF® pulp" is obtained by fibrillation of the fibres of specific polyacrylate grades by Engineered Fibers Technology, has main fibres with a diameter of about 20 μm and a length up to 7 mm, fibrils of diameter of around 1 μm, and surface area up to 50 $m^2/g$.

Microfibrillated cellulose fibres are natural fibres obtained by cellulose fibrillation, for example from WEIDMANN FIBER TECHNOLOGY, generally have a length of 0.05-1 mm, and fibril diameter typically of less than 1 μm.

Setralit® fibrillated natural fibres by ECCO Gleittechnik are obtained by mechanical treatment of plant fibres and have a maximum length of 7-8 mm and a surface area of around 1 $m^2/g$.

The fibrillated polymeric fibres preferably used in the present invention consist of a main trunk with a length ranging from about 0.05 to about 8 mm, preferably from about 0.1 to about 2 mm, a diameter of between 5 and 30 μm, and an aspect ratio greater than 30, from which a plurality of fibrils with a diameter smaller than the diameter of the main trunk branch off. The fibrillated polymeric fibres have a surface area of between about 0.5 and about 60 $m^2/g$, from about 10 to about 200 times greater than the surface area of an equivalent but not fibrillated polymeric fibre.

The vulcanisable elastomeric compound useful in the present invention comprises 100 phr of at least one diene elastomeric polymer.

Preferably, the diene elastomeric polymer which can be used in the present invention can be selected from those commonly used in sulphur-crosslinkable elastomeric compounds, which are particularly suitable for producing tyres and tyre components, i.e. from elastomeric polymers or copolymers with an unsaturated chain characterised by a glass transition temperature (Tg) generally lower than 20°C, preferably in the range of from 0°C to −110°C.

These polymers or copolymers may be of natural origin or may be obtained by solution polymerization, emulsion polymerization or gas-phase polymerization of one or more conjugated diolefins, optionally mixed with at least one comonomer selected from monovinylarenes and/or polar comonomers in an amount not exceeding 60% by weight.

The conjugated diolefins generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer which can be used in the present invention can be selected, for example, from: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

According to a preferred embodiment, said vulcanisable elastomeric compound comprises at least 10% by weight, preferably between 20% by weight and 100% by weight, with respect to the total weight of said at least one diene elastomeric polymer, of natural rubber.

The above vulcanisable elastomeric compound may possibly comprise at least one elastomeric polymer of one or more monoolefins with an olefinic comonomer or derivatives thereof (a'). The monoolefins can be selected from: ethylene and α-olefins generally containing from 3 to 12 carbon atoms, such as for example propylene, 1-butene, 1-pentene, 1-hexene, 1-octene and mixtures thereof. The following are preferred: copolymers selected from ethylene and an α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene and mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; or mixtures thereof.

A diene elastomeric polymer or an elastomeric polymer functionalised by reaction with suitable terminating agents or coupling agents may also be used. In particular, the diene elastomeric polymers obtained by anionic polymerization in the presence of an organometallic initiator (in particular, an organolithium initiator) may be functionalised by reacting the residual organometallic groups derived from the initiator with suitable terminating agents or coupling agents such as, for example, imines, carbodiimides, alkyltin halides, substituted benzophenones, alkoxysilanes or aryloxysilanes.

According to an aspect of the present invention, the fibrillated polymeric fibres (for example Kevlar® Pulp) of micrometric dimensions are incorporated in the diene elastomeric polymer together with the other components to yield the vulcanisable elastomeric compound with which the tread band of tyre for bicycle wheels is made.

Preferably, said fibrillated polymeric fibres are present in the elastomeric compound in an amount of from 0.1 phr to 20 phr, preferably from 0.5 phr to 10 phr, preferably from 1 phr to 5 phr.

Preferably, the vulcanisable elastomeric compound comprises a reinforcement filler.

Preferably, the reinforcement filler is present, selected from among carbon black, precipitated amorphous silica, amorphous silica of natural origin, preferably non-modified silicate fibres and mixtures thereof.

Preferably, the reinforcement filler is present in the vulcanisable elastomeric compound in an amount generally ranging between 1 phr and 120 phr, preferably between 20 phr and 90 phr.

Preferably, the overall amount of reinforcement filler present in the vulcanisable elastomeric compound is at least 20 phr, more preferably at least 30 phr.

Preferably, the overall amount of reinforcement filler present in the vulcanisable elastomeric compound is in the range between 20 phr and 120 phr, more preferably between 30 phr and 90 phr.

Preferably, the reinforcement filler is or comprises carbon black having a surface area not smaller than 20 $m^2/g$ (as determined by STSA—statistical thickness surface area according to ISO 18852:2005).

Preferably, said carbon black reinforcement filler is present in the vulcanisable elastomeric compound in an amount ranging between 1 phr and 120 phr, preferably between 20 phr and 90 phr.

Advantageously, the reinforcement filler is or comprises silica, selected from a pyrogenic silica or, preferably, a precipitated silica, with a BET surface area (measured according to the ISO 5794/1 standard) of between 50 $m^2/g$ and 500 $m^2/g$, preferably between 70 $m^2/g$ and 200 $m^2/g$.

The vulcanisable elastomeric compound comprises at least one vulcanising agent.

The vulcanising agent most advantageously used is sulphur, or, alternatively, sulphur-containing molecules (sulphur donors), with accelerators, activators and/or retardants known by the man skilled in the art.

Sulphur or derivatives thereof may advantageously be selected, for example, from: (i) soluble sulphur (crystalline sulphur); (ii) insoluble sulphur (polymeric sulphur); (iii) sulphur dispersed in oil (such as 33% sulphur, known by the trade name Crystex OT33 from Eastman); (iv) sulphur donors such as, for example, caprolactam disulphide (CLD), bis[(trialkoxysilyl)propyl]polysulphides, dithiophosphates; and mixtures thereof.

The vulcanising agent is present in the vulcanisable elastomeric compound in an amount of from 0.1 to 15 phr, preferably from 0.5 to 10 phr, even more preferably from 1 to 7 phr.

The vulcanisable elastomeric compound may optionally further comprise at least one silane coupling agent able to interact with the silica possibly present as reinforcement filler and/or the silicates and to bind it to the diene elastomeric polymer during the vulcanisation.

Preferably, the vulcanisable elastomeric compound comprises at least one coupling agent.

Preferably, the silane coupling agent which may be used in the present invention is selected from those having at least one hydrolyzable silane group, which may be identified, for example, by the following general formula (IV):

where the R groups, which may be the same or different, are selected from: alkyl, alkoxy or aryloxy groups or from halogen atoms, provided that at least one of the R groups is an alkoxy or aryloxy group or a halogen; n is an integer of between 1 and 6, inclusive; X is a group selected from: nitrous, mercapto, amino, epoxide, vinyl, imide, chlorine, —(S)$_m$C$_n$H$_{2n}$—Si—(R)$_3$ and —S—COR, where m and n are integers of between 1 and 6 inclusive and the R groups are as defined above.

Among the silane coupling agents, bis(3-triethoxysilyl-propyl)tetrasulphide and bis(3-triethoxysilylpropyl)disulphide are particularly preferred. Said coupling agents may be used as such or as a suitable mixture with an inert filler (such as carbon black) so as to facilitate their incorporation into the vulcanisable elastomeric compound.

Preferably, said silane coupling agent is present in the vulcanisable elastomeric compound in an amount ranging between 0.1 phr and 20 phr, preferably between 0.5 phr and 10 phr.

Preferably, the vulcanising agent is used in combination with accelerators and activators known by the man skilled in the art.

The accelerators which are commonly used may be selected from: dithiocarbamates, guanidine, thiourea, thiazoles, sulphenamides, thiurams, amines, xanthates and mixtures thereof.

Preferably, the vulcanisation accelerators are present in the vulcanisable elastomeric compound in amounts from 0.1 to 8 phr, preferably from 0.3 to 6 phr.

Activators that are particularly effective are zinc compounds, and in particular ZnO, ZnCO$_3$, zinc salts of saturated or unsaturated fatty acids containing from 8 to 18 carbon atoms, such as, for example, zinc stearate, which are preferably formed in situ in the vulcanisable elastomeric compound from ZnO and fatty acid, as well as Bi$_2$O$_3$, PbO, Pb$_3$O$_4$, PbO$_2$, or mixtures thereof.

Preferably, the vulcanisation activators are present in the vulcanisable elastomeric compound in amounts of from 0.2 to 15 phr, preferably from 0.5 to 10 phr.

The vulcanisable elastomeric compounds described above may comprise other commonly used additives, selected on the basis of the specific application for which the compound is intended. For example, said compounds may be admixed with: antioxidants, anti-ageing agents, plasticisers, adhesives, anti-ozone agents, modifying resins, or mixtures thereof.

In particular, in order to further improve the processability, said vulcanisable elastomeric compound may be admixed with at least one plasticiser generally selected from mineral oils, vegetable oils, synthetic oils, polymers with a low molecular weight and mixtures thereof, such as, for example, aromatic oil, naphthenic oil, phthalates, soybean oil and mixtures thereof. The amount of plasticiser generally ranges from 0 phr and 70 phr, preferably from 5 phr to 30 phr.

The vulcanisable elastomeric compounds described above can be prepared by mixing together the polymeric components with the reinforcement filler and the other additives possibly present according to techniques known in the industry. The mixing can be performed, for example, using an open mixer of the "open-mill" type or an internal mixer of the type with tangential rotors (Banbury®) or with interpenetrating rotors (Intermix), or in continuous mixers of the Ko-Kneader™ type (Buss®) or of the twin-screw or multi-screw type.

According to an aspect of the present invention, at least one protective layer is interposed between said carcass structure and said tread band, said protective layer comprising (i) a plurality of reinforcing cords of textile material oriented with respect to the equatorial plane of the tyre with an angle greater than 30°, (ii) a square fabric with textile fibres of the weft or warp oriented with respect to the equatorial plane of the tyre with an angle greater than 20°, or (iii) a non-woven fabric with randomly oriented textile fibres. In a preferred embodiment, the protective layer comprises reinforcing cords made of textile material oriented with respect to the equatorial plane of the tyre with an angle greater than 35°, more preferably greater than 45°, and even more preferably greater than 60°.

In a preferred alternative embodiment, the protective layer comprises a square fabric with textile fibres of the weft or warp oriented with respect to the equatorial plane of the tyre with an angle greater than 25°, more preferably greater than 30°, and even more preferably greater than 45°.

In a preferred alternative embodiment, the protective layer comprises a non-woven fabric with randomly oriented textile fibres arranged in layers or crossed, preferably made by mechanical or thermal processes, or by the use of adhesives.

Preferably, said protective layer has an extension equal to or greater than 30% of the axial development of the tread band, preferably equal to or greater than 50% of the axial development of the tread band, more preferably equal to or greater than 70% of the axial development of the tread band, and even more preferably equal to or greater than 90% of the axial development of the tread band.

According to a particularly advantageous embodiment, the protective layer has an extension equal to or greater than 100% of the axial development of the tread band, that is to say, the extension of the protective layer is equal to the axial development of the tread band, or extends beyond the axial development of the tread band, turning up around the bead cores at the beads.

Advantageously, the protective layer extends up to 65% of the axial development of the tyre, more preferably up to 75% of the axial development of the tyre, even more preferably up to 85% of the axial development of the tyre.

According to a further particularly preferred embodiment, the width of said protective layer extends up to 100% of the axial development of the tyre from bead to bead.

Preferably, said protective layer extends symmetrically with respect to the equatorial plane of the tyre.

Preferably, the protective layer comprises a textile material selected from the group comprising one or more of aramid fibres, lyocell fibres, nylon fibres, rayon fibres, cotton fibres, polyester fibres (such as PET, PEN fibres) and vinyl fibres (PVA).

Advantageously, the protective layer comprises a textile material which comprises fibres with a high elastic modulus, such as, for example, aramid fibres and lyocell fibres.

Preferably, said protective layer has a density greater than or equal to about 20 TPI, more preferably greater than or equal to, about 30 TPI.

Preferably, said protective layer has a density smaller than, or equal to, about 300 TPI, more preferably smaller than, or equal to, about 250 TPI.

Preferably, the reinforcing cords of said protective layer have a diameter smaller than, or equal to, about 0.6 mm, more preferably smaller than, or equal to, about 0.4 mm.

Preferably, the reinforcing cords of said protective layer have a diameter greater than, or equal to, about 0.10 mm, more preferably greater than, or equal to, about 0.12 mm.

Preferably, the reinforcing cords of said protective layer have a linear density greater than, or equal to, about 40 dtex, more preferably greater than, or equal to, about 100 dtex.

Preferably, the reinforcing cords of said protective layer have a linear density smaller than, or equal to, about 1300 dtex, more preferably smaller than, or equal to, about 940 dtex.

Optionally, the tyre for bicycle wheels of the present invention comprises at least one further protective layer arranged in a radially inner position with respect to said tread band, preferably interposed in said carcass structure or in a radially inner position with respect to said carcass structure.

Preferably, the features described above also apply to said further protective layer.

Preferably, the carcass structure of the tyre of the present invention comprises at least one carcass ply engaged, at the axially opposite end flaps thereof, with a pair of annular anchoring structures and including a plurality of reinforcing cords inclined, with respect to an equatorial plane of the tyre, by a first angle of between about 30° and about 60°, ends included.

Preferably, the reinforcing cords of said at least one carcass ply are made of a textile material, so as to limit the weight of the tyre as much as possible.

In a first embodiment of the tyre, the carcass structure comprises a single carcass ply. Hereinafter, such a tyre is also referred to as a "single-ply tyre".

In a second embodiment of the tyre, the carcass structure comprises a first carcass ply comprising a first plurality of reinforcing cords inclined, with respect to said equatorial plane, by said first angle and a second carcass ply arranged in a radially outer position to the first carcass ply and including a second plurality of reinforcing cords inclined, with respect to said equatorial plane, by said first angle on the side opposite to said first plurality of cords, so as to define a crossed, preferably two-ply, carcass structure. Hereinafter, such a tyre is also referred to as a "two-ply tyre".

In alternative embodiments, the carcass structure may comprise more than two carcass plies, each carcass ply being arranged so as to define a cross-structure with the adjacent radially inner carcass ply, completely identical to that described above with reference to the first and second carcass plies.

Preferably, in the case of a single-ply tyre, said first angle is preferably greater than about 30°, more preferably greater than about 40°, even more preferably equal to about 45°.

Preferably, in the case of a "two-ply" tyre, said first angle is between about 30° and about 60°, ends included.

In the case of a tyre for wheels of racing or city bicycles, preferably, the single carcass ply (in the case of a single-ply tyre), or each of the carcass plies (in the case of a tire with two or more carcass plies), has a density greater than, or equal to, about 20 TPI, more preferably greater than, or equal to, about 30 TPI, even more preferably greater than, or equal to, about 60 TPI, even more preferably greater than, or equal to, about 120 TPI.

In the case of a tyre for wheels of racing or city bicycles, preferably, the single carcass ply (in the case of a single-ply tyre), or each of the carcass plies (in the case of a tyre with two or more carcass plies), has a density of less than, or equal to, about 360 TPI, more preferably less than, or equal to, about 300 TPI, even more preferably less than, or equal to, about 240 TPI, even more preferably less than or equal to, about 200 TPI.

In the case of a tyre for off-road bicycle wheels, preferably, the single carcass ply (in the case of a single-ply tyre), or each of the carcass plies (in the case of a tyre with two or more carcass plies), has a density greater than, or equal to, about 20 TPI, more preferably greater than, or equal to, about 60 TPI.

In the case of a tyre for off-road bicycle wheels, preferably, the single carcass ply (in the case of a single-ply tyre), or each of the carcass plies (in the case of a tire with two or more carcass plies), has a density of less than, or equal to, about 150 TPI, more preferably less than, or equal to, about 120 TPI.

It is preferable that, in the case of a two-ply (or more than two carcass plies) tyre, the second carcass ply (or at least another carcass ply) has a density substantially identical to that of the first carcass ply.

Preferably, the reinforcing cords of the single carcass ply (in the case of a single-ply tyre) or of each carcass ply (in the case of a two-ply or more than two carcass plies tyre) have a diameter smaller than equal to, about 0.55 mm, more preferably smaller than, or equal to, about 0.35 mm.

Preferably, the reinforcing cords of the single carcass ply (in the case of a single-ply tyre) or of each carcass ply (in the case of a two-ply or more than two carcass plies tyre) have a diameter greater than, or equal to, about 0.10 mm, more preferably greater than, or equal to, about 0.12 mm.

Preferably, the reinforcing cords of the single carcass ply (in the case of a single-ply tyre) or of each carcass ply (in the case of a two-ply or more than two carcass plies tyre) have a linear density greater than, or equal to, about 110 dtex, more preferably greater than, or equal to, about 200 dtex.

Preferably, the reinforcing cords of the single carcass ply (in the case of a single-ply tyre) or of each carcass ply (in the case of a two-ply or more than two carcass plies tyre) have a linear density of less than equal to, about 1300 dtex, more preferably less than, or equal to, about 940 dtex.

Preferably, in the case of a tyre for racing bicycle wheels, the tyre has a weight of less than about 350 g, preferably less than, or equal to, about 250 g.

Preferably, in the case of tyres for wheels of off-road bicycles, the tyre has a weight greater than, or equal to, about 300 g, more preferably greater than, or equal to, about 350 g.

Preferably, in the case of a tyre for city bicycle wheels, the tyre has a weight greater than about 250 g, preferably greater than, or equal to, about 350 g.

Preferably, in the case of a tyre for wheels of off-road or city bikes, the tyre has a weight of less than, or equal to, about 2 kg, more preferably less than, or equal to, about 1.5 kg, even more preferably less than, or equal to, about 750 g, even more preferably less than, or equal to, about 650 g.

In preferred embodiments, in the case of a tyre for off-road bicycle wheels, the tyre has a weight of between about 300 g and about 2 kg, more preferably between about 350 g and about 1.5 kg, more preferably between about 350 g and about 750 g, more preferably between about 350 g and about 650 g, ends included.

DETAILED DESCRIPTION OF EMBODIMENTS OF THE INVENTION

Further features and advantages of the tyre of the present invention will appear more clearly from the following detailed description of some preferred embodiments thereof, made with reference to the accompanying drawings. In such drawings.

Figure 1:
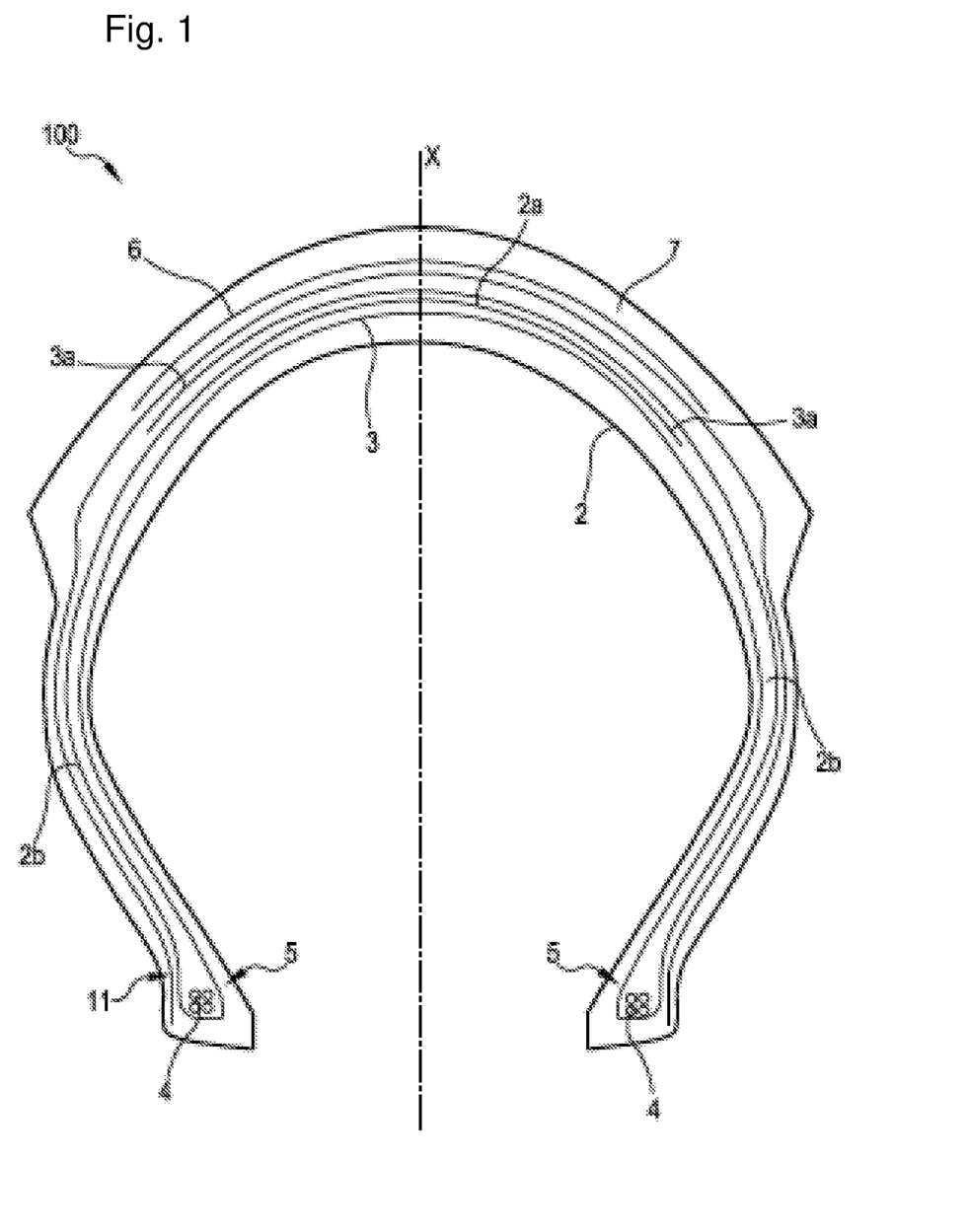
FIG. 1 is a schematic radial sectional view of a tyre for a racing bicycle wheel according to a first embodiment of the present invention.

In FIG. 1, reference numeral 100 indicates a tyre for bicycle wheels according to the present invention. The tyre 100 in FIG. 1 is characterised by a high transverse camber.

The tyre can be designed to be mounted on the wheels of a racing bicycle, either off-road or city.

Preferably, in the crown portion 2a of a tyre for racing bicycle, the radius of camber of the tyre 100 is between 10 mm and 18 mm, more preferably between 12 mm and 15 mm, ends included, while in the side portions 2b the radius of camber is between 15 mm and 30 mm, more preferably between 20 mm and 25 mm. For example, the radius of camber in the crown portion 2a may be equal to about 13 mm and the radius of camber in the side portions 2b may be equal to about 25 mm.

Preferably, in the crown portion 2a of a tyre for off-road bicycle, the radius of camber of the tyre 100 is between 15 mm and 50 mm, more preferably between 25 mm and 35 mm, ends included, while in the side portions 2b the radius of camber is between 15 mm and 60 mm, more preferably between 30 mm and 40 mm. For example, the radius of camber in the crown portion 2a may be equal to about 30 mm and the radius of camber in the side portions 2b may be equal to about 35 mm.

The tyre 100 in FIG. 1 comprises a carcass structure 2 comprising a crown portion 2a preferably arranged symmetrically with respect to the equatorial plane X-X and opposite side portions 2b arranged on sides axially opposite to the crown portion 2a.

In the embodiment shown in the accompanying drawings, the carcass structure 2 comprises a single carcass ply 3 (a single-ply tyre), but other embodiments (such as for example those shown in FIG. 4) are provided in which the carcass structure 2 comprises several carcass plies, preferably two (two-ply tyre).

What is described below with reference to the carcass ply shown in the drawings applies both to the single carcass ply of the single-ply tyre and to each carcass ply of the two-ply tyre, unless explicitly stated otherwise.

The carcass ply 3 extends axially from a side portion 2b of the carcass structure 2 to the opposite side portion 2b.

The carcass ply 3 is engaged, at respective axially opposite end flaps 3a thereof, with respective annular anchoring structures 4, typically called "bead cores".

Each end flap 3a of the carcass ply 3 is back folded around a respective bead core 4.

The bead cores 4 are preferably made of textile fibres with high elastic modulus, such as for example aramid fibres (common name of the aromatic polyamide fibres) or of metal wires, such as for example steel.

A tapered elastomeric filler which occupies the space defined between the carcass ply 3 and the respective back-folded end flap 3 may be applied to the outer perimeter edge of the bead cores 4.

The area of the tyre comprising the bead core 4 and the possible elastomeric filler forms the so-called "bead", globally indicated in FIG. 1 with reference numeral 5, intended for anchoring, by means of elastically forced fitting, the tyre on a corresponding mounting rim, not shown.

In a radially outer position with respect to the carcass structure 2 a tread band 7 is provided, whereby the tyre 100 contacts the road surface.

Preferably, the tread band of a tyre can have a thickness of between about 0.8 and about 8 mm depending on the type of tyre.

As shown in FIGS. 2-4 and 6, a reinforced ribbon-like element 10 may be applied to the back-folded end flap 3a of the carcass ply 3, at each bead 5. Such a reinforced ribbon-like element 10 is interposed between the carcass ply 3 and the rim of the wheel when the tyre is mounted on such a rim. Such a ribbon-like element may be replaced by an abrasion-resistant rubber strip. Instead of the reinforced ribbon-like element 10, a single reinforcing cord can be used, possibly deposited after a tackifying treatment.

With reference to the tyre in FIG. 1, the two edges of the carcass flaps 3a each extend to cover the crown portion 2a overlapping to form three carcass layers in the crown portion 2a with a first radially inner carcass layer.

The tyre 100 if intended for the wheels of racing bicycles typically has an axial development preferably of between about 19 mm and about 38 mm, more preferably between about 19 mm and about 32 mm, even more preferably between about 23 mm and about 30 mm, ends included.

In the case of a tyre designed for wheels for off-road bicycles, the tyre 100 has an axial development preferably of between about 37 mm and about 120 mm, ends included.

The tyre 100 intended for city bicycle wheels typically has an axial development preferably of between about 32 mm and 62 mm, ends included. The tyre 100 intended for the various types of bicycles has an outer diameter (which, according to the English denomination, is expressed in inches) preferably of between about 24 inches and about 29 inches, more preferably between about 26 inches and about 29 inches, ends included. Correspondingly, the fitting diameter according to the ISO or E.T.R.T.O. convention is preferably about 559 mm (which corresponds to an outer diameter of 26 inches for off-road bicycles), or about 571 mm (which corresponds to an outer diameter of 26 inches for road racing bicycles), or about 584 mm (which corresponds to an outer diameter of 27.5 inches for off-road bicycles), or about 622 mm (which corresponds to an outer diameter of 28 inches for road racing bicycles and to an outer diameter of 29 inches for off-road bicycles) or about 630 mm (which corresponds to a particular outer diameter of 27 inches for road racing bicycles).

Figure 2:
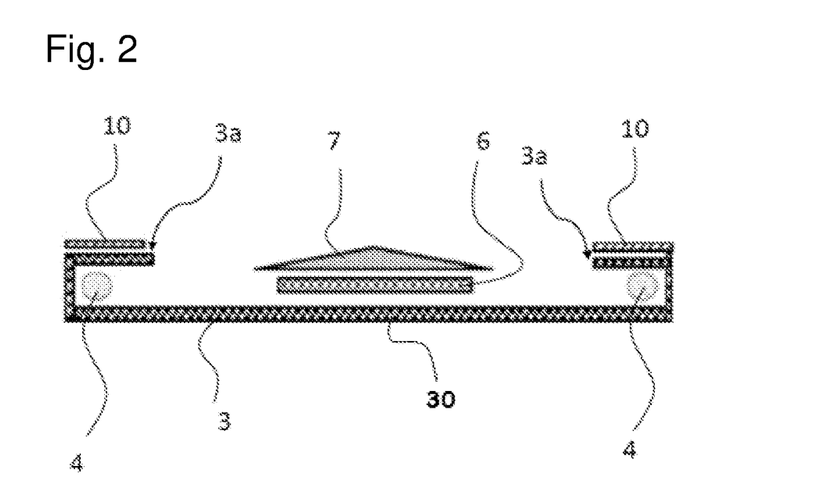
FIGS. 2-8 show possible schematic construction diagrams of embodiments of tyres according to the invention.
Figure 3:
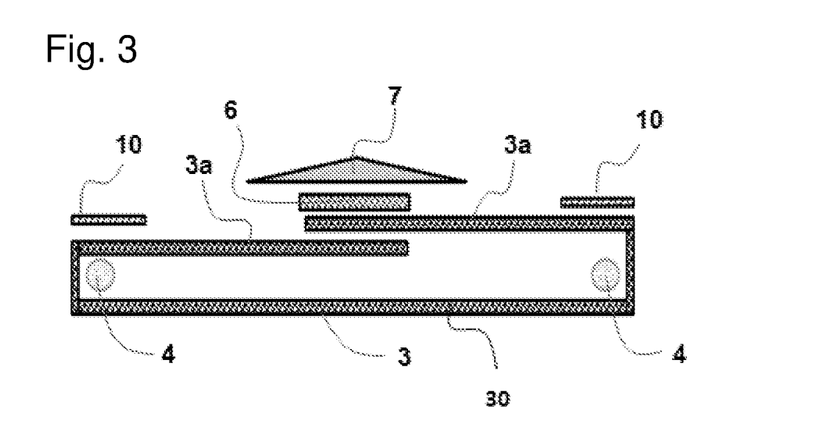
Figure 4:
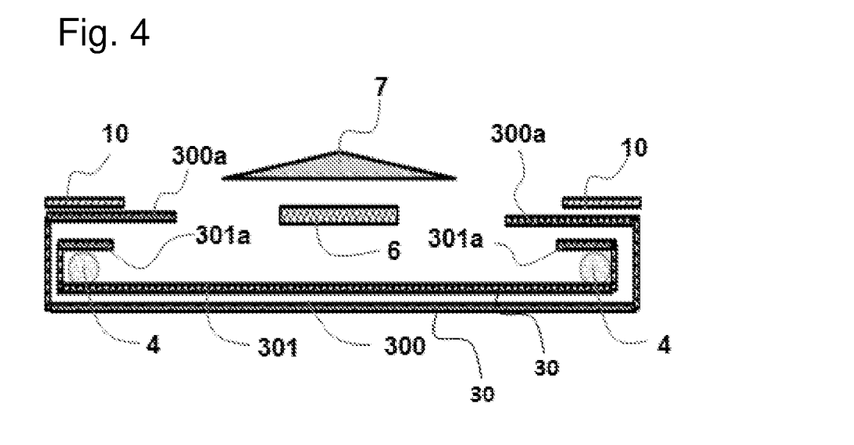

The carcass ply 3 of the tyre 100 is preferably coated with an elastomeric mixture and comprises a plurality of reinforcing cords 30 arranged substantially parallel to one another. In FIGS. 2-4, the reference numeral 30 is associated with the set of reinforcing cords.

The reinforcing cords 30 are preferably made of a textile material selected from Nylon, Rayon, PET, PEN, Lyocell, Aramid, Cotton or Corespun (cotton reinforced with polyester), preferably Nylon or Corespun or combinations thereof, in one or more ends, preferably 1 or 2 ends.

The reinforcing cords 30 have a diameter preferably of between about 0.10 mm and about 0.55 mm, more preferably between about 0.12 mm and about 0.35 mm, ends included, for example equal to about 0.13 mm.

The reinforcing cords 30 have a linear density of between about 110 dtex and about 1300 dtex, more preferably between about 230 dtex and about 940 dtex, ends included, for example equal to about 470 dtex.

Specific examples of textile materials that can be used for the aforementioned reinforcing cords 30 are Nylon 930 dtex/1, Nylon 470 dtex/1, Nylon 230 dtex/1, and Aramide 470/1 fibres, where number 1 after dtex indicates the number of ends.

The reinforcing cords 30 may however be made of steel, in which case they have a diameter preferably of between 0.08 mm and 0.175 mm, ends included.

The reinforcing cords 30 are inclined, with respect to the equatorial plane of the tyre 100, by an angle of between about 30° and about 60°, ends included.

The carcass ply 3 of the tyre 100 for wheels of racing or city bicycles preferably has a rope density of between about 15 TPI and about 360 TPI, more preferably between about 30 TPI, and about 300 TPI, ends included, for example equal to about 240 TPI.

Preferably, in the case of a two-layer tyre, each carcass ply has a cord density of between about 15 TPI and about 200 TPI, more preferably between about 30 TPI and about 180 TPI, ends included, for example equal to about 120 TPI.

The carcass ply 3 of the tyre 100 for off-road bicycle wheels preferably has a cord density of between about 15 TPI and about 150 TPI, more preferably between about 30 TPI and about 120 TPI.

Preferably, in the case of a two-ply tire or with more than two carcass plies, each carcass ply has a cord density of between about 15 TPI and about 120 TPI, more preferably between about 30 TPI and about 90 TPI.

According to an aspect of the present invention, with reference to the figures, one or more protective layers 6 and possibly 11 are interposed between the tread band 7 and the carcass structure 2.

As shown in FIG. 1, the protective layer 6 extends throughout the axial extension of the tread band 7, while the protective layer 11 extends throughout the axial development of the tyre 100, from a bead to the opposite bead.

The embodiment shown in FIG. 1 is a particularly preferred embodiment, but numerous variations may be within the scope of the present invention.

For example, the tyre 100 in FIG. 1 may comprise only the protective layer 6 or only the protective layer 11, or both as illustrated in FIG. 1.

Alternatively, as shown in FIGS. 2-6, the protective layer 6 has an extension smaller than that of the axial extension of the tread band 7, for example equal to 30%, 35%, 40%, 45%, 50%, 55%, 60%, 65%, 70%, 75%, 80%, 85%, 90% or 95% of the axial development of the tread band.

Alternatively, the protective layer 11 has an extension smaller than that of the axial development of the tyre 100, for example equal to 50%, 55%, 60%, 65%, 70%, 75%, 80%, 85%, or 95% of the axial development of the tyre.

Figure 6:
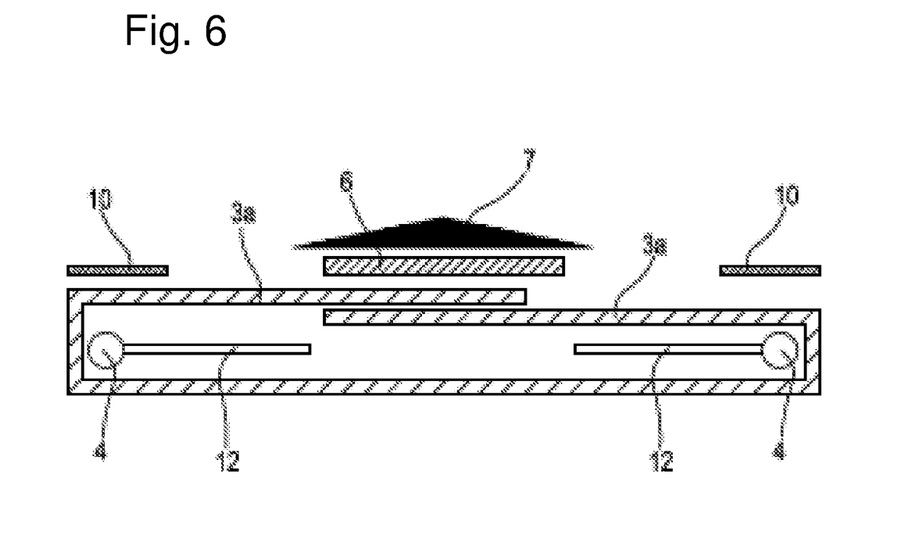

According to an optional embodiment, a further protective layer 12 may be interposed in the carcass structure 2, in particular inside the flap of the carcass ply 3. In this case, the protective layer 12 may extend only for the portions of the respective sidewalls, as shown in FIG. 6, but it may also extend throughout the axial development of the tyre or only for the axial development of the tread.

According to a further optional embodiment, a further protective layer 12 may be placed in a radially inner position with respect to the carcass structure 2. In this case, the protective layer 12 may extend throughout the axial development of the tyre and also back fold around the respective beads 5, as shown in FIG. 5, but it may also have a smaller extension.

Figure 5:
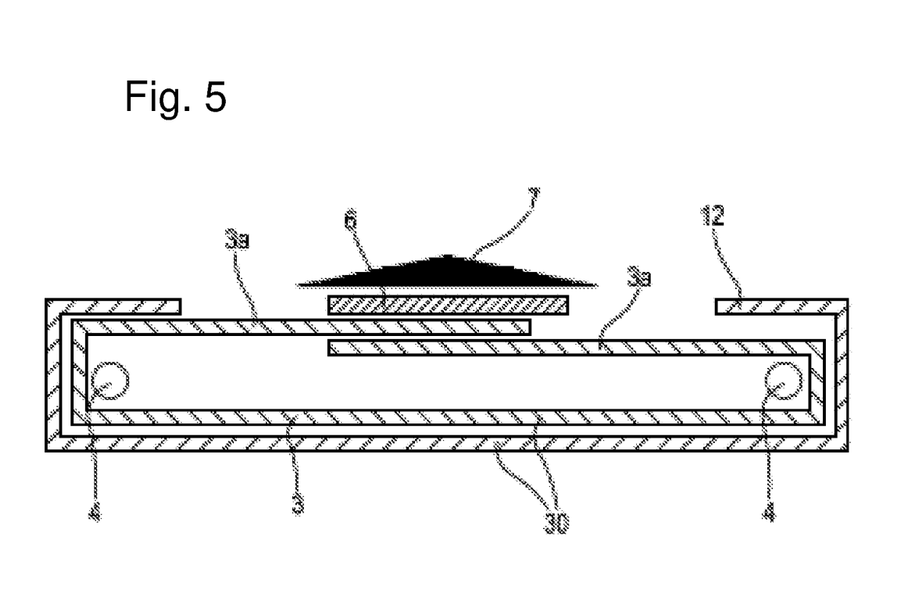

The protective layer 12 may therefore have an extension equal to or less than the axial development of the tyre 100, for example equal to 50%, 55%, 60%, 65%, 70%, 75%, 80%, 85%, 90% or 95% of the axial development of the tyre, but it may also extend over a width greater than the axial development of the tyre, sufficient to back fold around the respective beads 5, as illustrated in FIG. 5.

The protective layer 6, 11 and/or 12 is preferably made of a textile material selected from aramidic fibres, lyocell fibres, nylon fibres, rayon fibres, cotton fibres, polyester fibres (such as PET fibres, PEN) and vinyl fibres (PVA), and advantageously with a textile material which includes fibres with high elastic modulus, such as, for example, aramid fibres and lyocell fibres.

The protective layer 6, 11 and/or 12 preferably shows a density of between 20 TPI and 300 TPI, ends included, and more preferably between 30 TPI and 250 TPI, ends included.

The tread band 7 is made with a vulcanisable elastomeric compound comprising fibrillated polymeric fibres of micrometric dimensions as described above.

The tread band 7 extends axially and in a radially outer position with respect to the crown structure 2a and to the protective layer 6 by a width section which may be less than or at least equal to that of the crown structure 2a and of the protective layer 6.

The weight of the tyre 100 for racing bicycle wheels is less than about 350 g, preferably less than, or equal to, about 250 g.

The weight of the tyre 100 for city bicycle wheels is greater than about 250 g, preferably greater than, or equal to, about 350 g.

The weight of the tyre 100 for off-road bicycle wheels is greater than, or equal to, about 300 g, more preferably greater than or equal to, about 350 g.

In a tyre intended for an off-road bicycle wheel, the tread band 7 comprises a plurality of blocks.

Preferably, the building of the tyre 100 takes place according to procedures known to the man skilled in the art.

FIGS. 2-8 illustrate different tyre construction schemes.

In the construction diagram in FIG. 2, the end flaps 3a of the carcass ply 3 are axially spaced apart from one another and are in axial positions different from that of the tread 7 and of the protective layer 6. In the specific example in FIG. 2, the reinforced ribbon-like element 10 is applied to the folded end flap 3a of the carcass ply 3, but it may not be present.

FIG. 3 schematically shows an alternative embodiment of a single-ply tyre according to the present invention.

This embodiment differs from that in FIG. 2 in that the end flaps 3a are partially superimposed on one another at the tread 7 and the protective layer 6.

In the embodiment in FIG. 3, in the vicinity of the beads 5, the reinforced ribbon-like element 10 is applied to the folded end flap 3a of the carcass ply 3, but it may not be present.

FIG. 4 schematically shows a further alternative embodiment of a two-ply tyre according to the present invention.

In the embodiment in FIG. 4, both carcass plies 300, 301 have their respective opposite end flaps 300a, 301a backfolded around the bead cores 4, axially spaced from each other and in axial positions different from that of the tread 7 and the protective layer 6.

FIG. 5 schematically shows an alternative embodiment of a single-ply tyre according to the present invention.

In the embodiment in FIG. 5, the protective layer 12 extends throughout the axial development of the tyre in a radially inner position with respect to the carcass structure 2 and back folds around the bead cores 5 to reinforce the beads 5.

FIG. 6 schematically shows an alternative embodiment of a single-ply tyre according to the present invention.

In the embodiment in FIG. 6, the protective layer 12 departs from the bead cores inside the flap of the carcass ply 3 extending only through the axial extension portion of the tyre corresponding to the respective sidewalls.

Figure 7:
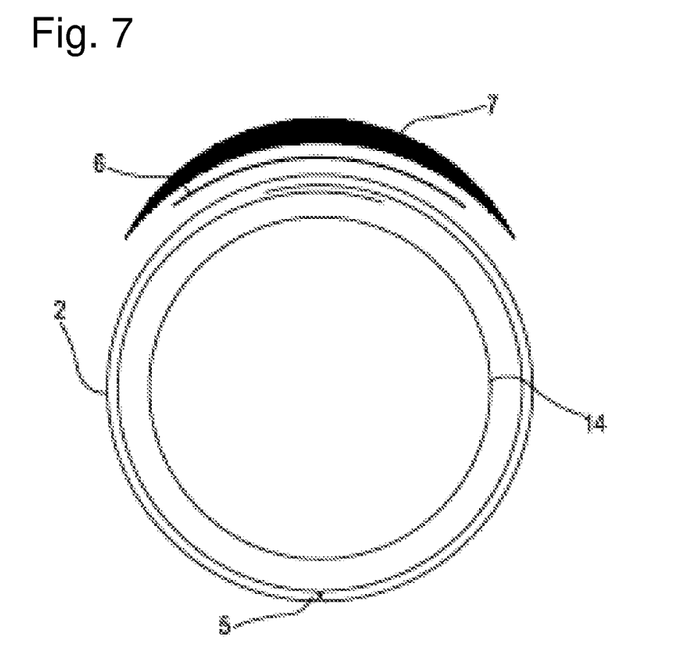
Figure 8:
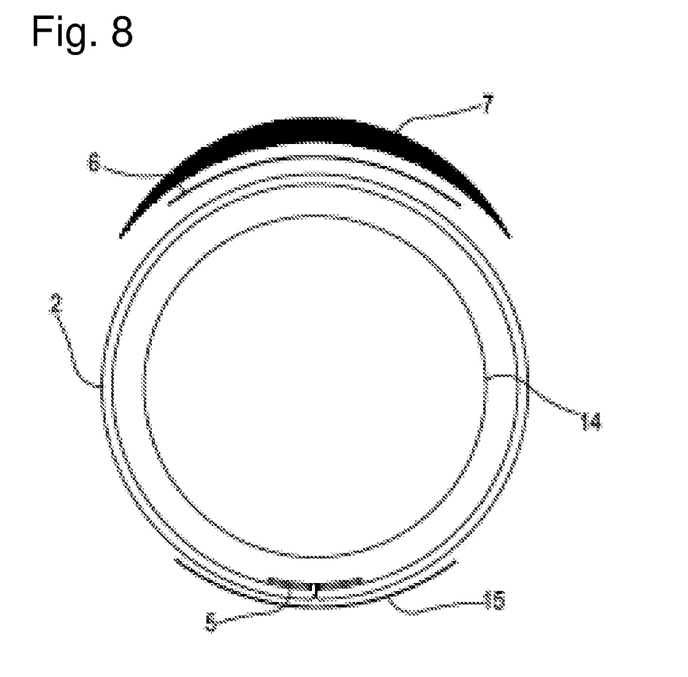

An alternative embodiment is that of the tubular tyre shown in FIGS. 7 and 8.

The tubular tyre is characterised by a construction similar to that of the tyre 100 in FIG. 1, where the ends of the carcass structure 2 at the beads 5 are sewn or joined together by means of a belt 15, generally of cotton or Corespun. The carcass structure 2 consists of Corespun or Corespun alternated with aramid, cotton or Nylon coated with latex or natural rubber, so as to make a ring tube with an inner tube 14 inside.

As shown in FIGS. 7 and 8, the protective layer 6 and the tread 7 are made in a position radially external to the carcass structure 2 and can be vulcanised with the carcass 2 or glued later.

The present invention will be further illustrated below by means of a number of examples, which are given purely as an indication and without any limitation of the present invention.

Example 1—Preparative Test

The elastomeric compounds for tread band 1 and 2, which comprise the different reinforcement fillers in the amounts indicated in table 1, were prepared as follows (the amounts of the various components are given in phr). All the components, except for sulphur, the retardant and the accelerant (CBS) were mixed together in an internal mixer (model Pomini PL 1.6) for about 5 minutes (1st step). As soon as the temperature reached 145+5° C., the elastomeric compound was unloaded. Sulphur, the retardant and the accelerator (CBS) were then added and mixing was performed in an open roll mixer (2nd step).

TABLE 1

| Components | 1 | 2 |
|---|---|---|
| Natural rubber | 50.00 | 50.00 |
| Synthetic rubber | 68.75 | 68.75 |
| Fibrillated polymeric fibres | 4.00 | 2.50 |
| Silica | 50.00 | 50.00 |
| Hydrocarbon resin | 3.00 | 3.00 |
| Stearic acid | 2.00 | 2.00 |
| TESPT | 4.50 | 4.50 |
| Zinc oxide | 2.50 | 2.50 |
| Wax | 2.00 | 2.00 |
| 6PPD | 3.00 | 3.00 |
| TBBS | 2.50 | 2.50 |
| Sulphur | 1.20 | 1.20 |

Natural Rubber STR 20 P 93, SRI Trang Agroindustry;
Synthetic rubber S-SBR - SLR 4630 Styron Sprintan ® polymer extended with 37.5 phr of oil per 100 phr of dry elastomeric polymer (68.75 phr of S-SBR extended oil equals 50 phr of Styrene Butadiene elastomer)
fibrillated polymeric fibres Kevlar ® Pulp, DuPont ®
Silica Zeosil ® 1165 MP Precipitated synthetic amorphous silica;
Hydrocarbon ResinNovares ® TT30;
Stearic Acid Sogis;
TESPT bis[3-(triethoxysilyl)propyl]tetrasulphide;
Zinc Oxide Zincol Ossidi;
Wax Antilux ® 654 microcrystalline wax;
6PPD N-(1,3-dimethylbutyl)-N'-phenyl-phenylene-diamine;
TBBS N-tertbutyl-2-benzothiazil sulphenamide(Vulkacit ® NZ);
Sulphur Redball Superfine, International Sulphur Inc.

Example 2—Preparation of the Tyre

Race tyres for bicycles were therefore prepared, with dimensions 28-622 according to the structure illustrated in FIG. 1 comprising a tread band made with the elastomeric compounds described in example 1. Tyre 1 included the tread band made with compound 1 (with a high content of Kevlar® pulp), while tyres 2 and 3 included the tread band made with compound 2 (with a low content of Kevlar® pulp). The tread band thickness was about 2.2 mm for all 1-3 tyres.

In all cases, the carcass structure was provided with a rubberised carcass ply of 0.4 mm total thickness in nylon 6.6 with a density of 60 TPI and a linear density of 460 dtex, back-folded on aramid bead cores and provided with two rubberised non-abrasive square fabrics at the edges.

The tyres 1 and 2 were made with a protective layer 6 (extended throughout the axial development of the tread band 7 as shown in FIG. 1) made of square fabric comprising reinforcing cords of aramid fibres of initial modulus 75 GPa with linear density 200 dtex and density 55 TPI (weft) and 80 TPI (warp) oriented with respect to the equatorial plane of the tyre with an angle of 45°, and a protective layer 11 (extended by all the axial development of the tyre 100, from bead to bead, as illustrated in FIG. 1) made of square fabric comprising reinforcing cords of nylon 6.6 fibres with initial module 6 GPa with linear density 117 dtex and density 90 TPI (weft) and 100 TPI (warp) oriented with respect to the equatorial plane of the tyre with an angle of 45°. The tyre 3 was made as the tyre 2, but without the protective layer 6, and therefore only with the protective layer 11.

Example 3—Anti-Puncture Test

Tyre samples having dimensions of about 20×200 mm obtained at the tread of the tyres 1-3 of the example 2 were subjected to a puncture test according to the DIN EN 14477 standard, adapted in the test conditions, as expressed below.

This test allows evaluating the resistance to perforation of a material by subjecting it to the action of a penetrator (a needle with a diameter of 0.8 mm), which penetrates the sample at a constant speed. The test is carried out with the aid of a dynamometer capable of recording the applied force (measured in N at different depths of penetration) and the elastic deformation of the material (measured in mm).

This applied force is therefore indicative of the resistance opposed by the sample to the penetration of a foreign body (the material is more resistant the higher the force value); and said elastic deformation is an expression of the material's ability to absorb the penetration of a foreign body (the material is the more elastic the higher the value of said deformation for the same force).

The tests were performed in a conditioned environment at a controlled temperature of 23°±2° C. The samples were conditioned for 48 hours before the test.

The test conditions used were the following:

test speed=50 mm/minute;

initial distance between the tip of the penetrator and the tyre=10 mm;

pre-load applied=0.5 N.

Tests were carried out on 10 samples and the average values obtained are given in the following Table 2.

TABLE 2

| | Strength (N) @ | | | | Energy (mJ) @ |
|---|---|---|---|---|---|
| Tyre | 1 mm | 2 mm | 3 mm | 3.5 mm | 3.5 mm |
| 1 | 5.58 | 13.84 | 30.90 | 43.90 | 52.50 |
| 2 | 4.70 | 11.68 | 27.50 | 41.90 | 45.60 |
| 3 | 4.54 | 11.20 | 24.11 | 33.60 | 41.00 |

Figure 9:
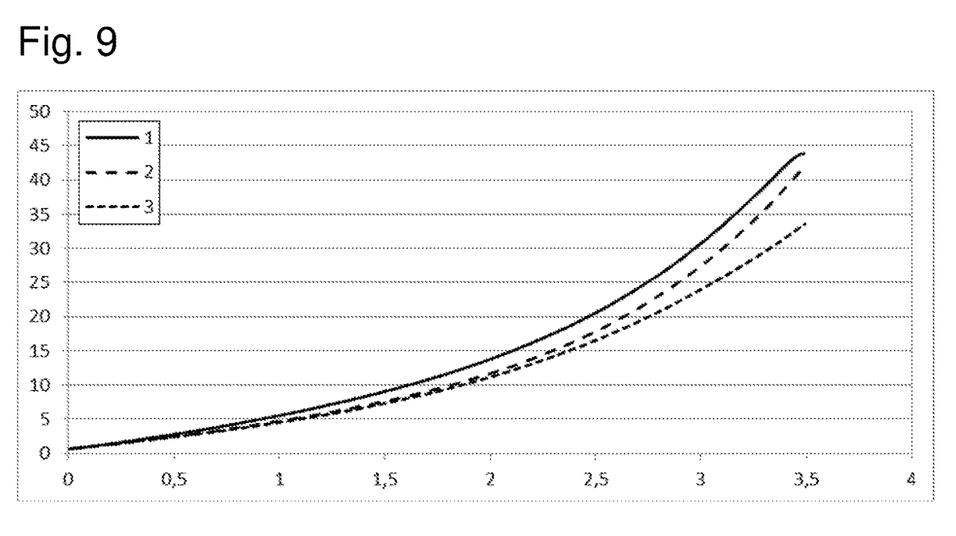
FIG. 9 shows the graph obtained as described in example 3 which shows the trend of the piercing force as the deformation of the material for the samples in example 2 increases.

The graph shown in FIG. 9 shows the trend of the piercing force as the deformation of the material increases. The graph, according to the data shown in Table 2, shows very close curves for all the samples.

The results obtained show a remarkable resistance to perforation found in all the samples, both those containing a high or low Kevlar content and those comprising one or two protective layers, which undergo significantly reduced deformations at the same time requiring a high piercing force to cause the same deformation.

The present invention has been described with reference to some preferred embodiments. Various modifications may be made to the embodiments described above, while remaining within the scope of protection of the invention, defined by the following claims.

The invention claimed is:

1. A tyre for bicycle wheels comprising:
a carcass structure;
a tread band arranged in a radially outer position with respect to the carcass structure with a vulcanized elastomeric material, wherein the vulcanized elastomeric material comprises, before vulcanization, a vulcanizable elastomeric compound comprising fibrillated polymeric fibres of micrometric dimensions; and
at least one protective layer interposed between the carcass structure and the tread band, wherein the protective layer comprises:
a plurality of reinforcing cords of textile material oriented with respect to the equatorial plane of the tyre with an angle greater than 30°;
a square fabric with textile fibres of the weft or warp oriented with respect to the equatorial plane of the tyre with an angle greater than 20° or
a non-woven fabric with randomly oriented textile fibres; and
wherein the tyre for bicycle wheels has a weight of less than, or equal to, about 2 kg, and
wherein a radius of camber of the tyre for bicycle wheels is between 10 mm and 18 mm in a crown portion and is between 15 mm and 30 mm in side portions of the tyre.

2. The tyre according to claim 1, further comprising at least one additional protective layer arranged in a radially inner position with respect to the tread band.

3. The tyre according to claim 2, wherein the additional protective layer arranged in a radially inner position with respect to the tread band is interposed in the carcass structure or is in a radially inner position with respect to the carcass structure.

4. The tyre according to claim 1, wherein the protective layer comprises a plurality of reinforcing cords of textile material oriented with respect to the equatorial plane of the tyre with an angle greater than 35°.

5. The tyre according to claim 1, wherein the protective layer comprises a square fabric with textile fibres of the weft or warp oriented with respect to the equatorial plane of the tyre with an angle greater than 25°.

6. The tyre according to claim 1, wherein the protective layer comprises a non-woven fabric with randomly oriented textile fibres arranged in layers or crossed.

7. The tyre according to claim 6, wherein the protective layer is made by using mechanical processes, thermal processes, and/or adhesives.

8. The tyre according to claim 1, wherein the protective layer has an extension equal to or greater than 30% of the axial development of the tread band.

9. The tyre according to claim 1, wherein the protective layer has an extension equal to or greater than 100% of the axial development of the tread band.

10. The tyre according to claim 1, wherein the protective layer extends up to 65% of the axial development of the tyre.

11. The tyre according to claim 1, wherein the protective layer extends up to 100% of the axial development of the tyre from bead to bead.

12. The tyre according to claim 1, wherein the protective layer extends symmetrically with respect to the equatorial plane of the tyre.

13. The tyre according to claim 1, wherein the protective layer comprises a textile material chosen from aramid fibres, lyocell fibres, nylon fibres, rayon fibres, cotton fibres, polyester fibres, vinyl fibres, and combinations thereof.

14. The tyre according to claim 1, wherein the protective layer comprises a textile material comprising high modulus elastic fibres.

15. The tyre according to claim 14, wherein the high modulus elastic fibres are aramid fibres and/or lyocell fibres.

16. The tyre according to claim 1, wherein the protective layer has a cord density greater than or equal to about 20 TPI.

17. The tyre according to claim 1, wherein the protective layer has a cord density less than or equal to about 300 TPI.

18. The tyre according to claim 1, wherein the fibrillated polymeric fibres are chosen from aramid fibres, polyester fibres, acrylic fibres, microfibrillated cellulose fibres, and vegetable fibres.

19. The tyre according to claim 1, wherein the fibrillated polymeric fibres have a diameter less than 100 μm and a length between about 0.05 mm and about 8 mm.

20. The tyre according to claim 1, wherein the fibrillated polymeric fibres exhibit an aspect ratio between the length and diameter greater than 30:1.

21. The tyre according to claim 1, wherein the fibrillated polymeric fibres exhibit a surface area ranging from about 0.5 $m^2/g$ to about 60 $m^2/g$.

22. The tyre according to claim 1, wherein the vulcanizable elastomeric compound comprises:
(a) 100 phr of at least one diene elastomeric polymer;
(b) 0.1 phr to 20 phr of the fibrillated polymeric fibres, and
(c) 1 to 120 phr of a reinforcement filler.

23. The tyre according to claim 22, wherein the fibrillated polymeric fibres are present in the elastomeric compound in an amount of from 0.5 phr to 10 phr, or from 1 phr to 5 phr.

* * * * *